United States Patent
Caldwell et al.

(10) Patent No.: US 7,546,684 B2
(45) Date of Patent: Jun. 16, 2009

(54) METHOD FOR REPAIR AND REPLACEMENT OF COMBUSTOR LINER PANEL

(75) Inventors: James M. Caldwell, Alexandria, KY (US); Edward John Emilianowicz, West Chester, OH (US); Gary Loveless, Edgewood, KY (US)

(73) Assignee: General Electric Company, Schenectady, NY (US)

( * ) Notice: Subject to any disclaimer, the term of this patent is extended or adjusted under 35 U.S.C. 154(b) by 717 days.

(21) Appl. No.: 10/901,262

(22) Filed: Jul. 27, 2004

(65) Prior Publication Data

US 2006/0021219 A1 Feb. 2, 2006

(51) Int. Cl.
*B21D 1/00* (2006.01)
*B21D 53/00* (2006.01)
*B21K 25/00* (2006.01)
*B23P 6/00* (2006.01)

(52) U.S. Cl. ............... 29/889.1; 29/402.03; 29/402.08; 29/889.2; 29/890.01

(58) Field of Classification Search ............... 29/889.1, 29/889.2, 890.01, 402.03, 402.08, 402.16, 29/402.19
See application file for complete search history.

(56) References Cited

U.S. PATENT DOCUMENTS

| | | | | |
|---|---|---|---|---|
| 4,485,630 A * | 12/1984 | Kenworthy | ................... | 60/757 |
| 4,912,922 A | 4/1990 | Maclin | | |
| 5,154,060 A * | 10/1992 | Walker et al. | ................. | 60/746 |
| 5,430,935 A * | 7/1995 | Yaworsky et al. | ......... | 29/889.1 |
| 5,924,288 A * | 7/1999 | Fortuna et al. | ................ | 60/752 |
| 6,032,361 A | 3/2000 | Makino et al. | | |
| 6,286,317 B1 * | 9/2001 | Burrus et al. | ................. | 60/752 |
| 6,345,441 B1 | 2/2002 | Farmer et al. | | |
| 6,415,610 B1 | 7/2002 | Parker | | |
| 6,434,821 B1 * | 8/2002 | Nelson et al. | ............ | 29/888.01 |
| 6,568,079 B2 | 5/2003 | Farmer et al. | | |
| 6,581,285 B2 | 6/2003 | Emilianowicz | | |
| 6,892,931 B2 * | 5/2005 | Steplewski et al. | .......... | 228/119 |

(Continued)

FOREIGN PATENT DOCUMENTS

EP 1 045 204 A1 10/2000

(Continued)

*Primary Examiner*—David P Bryant
*Assistant Examiner*—Alexander P Taousakis
(74) *Attorney, Agent, or Firm*—McNees Wallace & Nurick, LLC

(57) ABSTRACT

A method for repairing a damaged portion of a combustor inner liner assembly. The method includes removing the combustor from a gas turbine engine. After inspecting the combustor to determine whether cracks exists in portions of the inner liner assembly, the method includes removing a cracked inner liner assembly from the combustor. Then the portion of the inner liner assembly, comprising a multi-hole panel region, an aft lip region, an aft seal flange region and an aft panel support leg are separated from the inner liner assembly. The multi-hole panel region and aft lip, where fatigue damage typically exists, along with the aft seal flange region, are discarded and a new aft lip region/aft seal flange region and multi-hole panel region are provided. The new parts are joined to the aft panel support leg and the inner liner assembly aft of forward bolt flange region after these parts are refurbished. The inner liner assembly is then reattached to the combustor and reassembled into the engine.

19 Claims, 4 Drawing Sheets

U.S. PATENT DOCUMENTS

| | | | |
|---|---|---|---|
| 6,986,201 B2 * | 1/2006 | Moertle et al. | 29/890.01 |
| 7,185,432 B2 * | 3/2007 | Swaffar | 29/889.1 |
| 2002/0184762 A1 | 12/2002 | Farmer et al. | |
| 2002/0184763 A1 | 12/2002 | Emilianowicz | |
| 2004/0088988 A1 | 5/2004 | Swaffar | |

FOREIGN PATENT DOCUMENTS

| | | |
|---|---|---|
| EP | 1 090 711 A1 | 4/2001 |
| EP | 1 226 898 A2 | 7/2001 |
| EP | 1 266 718 A2 | 12/2002 |
| EP | 1426136 A1 | 6/2004 |
| EP | 1426687 A1 | 6/2004 |
| JP | 63-194129 | 8/1988 |
| JP | 2001-74245 | 3/2001 |

* cited by examiner

METHOD FOR REPAIR AND REPLACEMENT OF COMBUSTOR LINER PANEL

FIELD OF THE INVENTION

The present invention is directed to a method for repair of combustor liner panels, and more specifically to the repair of combustor inner liner panels in large high bypass turbofan engines.

BACKGROUND OF THE INVENTION

A turbine engine used to power aircraft typically includes a compressor section for compressing air, a combustor section for mixing the compressed air with fuel and burning it to generate hot gases, a turbine section in which energy is extracted from the hot gases of combustion to operate the compressor and otherwise provide the aircraft and an exhaust section in which the remaining hot gases of combustion of reduced energy pass to provide thrust which propels the aircraft. A turbofan turbine engine further includes a large fan typically located in front of the compressor. In the case of a front fan, the fan is driven by a second turbine, typically the low pressure turbine, located in the turbine section of the engine behind the high pressure turbine. In a low bypass turbofan turbine engine, typically used for supersonic flight, most of the air passing the fan enters into the compressor and an augmenter is added to supplement thrust. In a high bypass turbofan turbine engine, typically used for subsonic flight, more air flows around (bypasses) the engine, contributing to thrust while reducing specific fuel consumption. The present invention is directed to the combustor section of the turbine engine. Although the present invention finds immediate use in a high bypass turbofan turbine engine, specifically the GE-90, currently manufactured by General Electric Company, it also has applicability to other turbine engines including other high bypass turbine engines and low bypass turbine engines, As noted, in the combustor, fuel is mixed with compressed air and burned. The combustor is located in the engine aft of the compressor. The compressed air leaving the compressor passes into the combustor. The compressed air exits the compressor at a high velocity, with low static pressure. The diffuser at the aft end of the compressor reduces the air velocity, increasing the static pressure of the air. High static pressure and low velocity at the combustor entrance improves mixing in the combustion chamber. Fuel is metered into a swirl cup before it passes into the combustor.

The combustor is an assembly which typically consists of several individual pieces. The dome assembly establishes a bluff body to stabilize the flame. The inner and outer cowls and the inner and outer liners are typically bolted to the dome at its inside and outside diameter. The bolts and locking nuts typically are tack welded to prevent them from separating. The dome structure consists of a single spectacle plate, a die formed sheet metal part. A plurality of swirl cups are included in the dome assembly for swirling the fuel as it is mixed with the air. An igniter is provided to ignite the fuel-air mixture and burn it. The inner and outer combustor liners are typically fabricated from individual machined forgings or castings and are welded or bolted together.

The combustor liners form a substantially closed duct, typically annular, that channels the hot gases of combustion to the high pressure turbines. These combustor liners must withstand the temperature of combustion which can be 3000° F. or higher. To survive these conditions, exotic high temperature alloys are utilized. Each combustor is located within an inner and an outer structure. Cooling air flows along the exterior surfaces of the combustor in the annular region between the inner liners and the inner structure and outer liners and outer structure. To further assist in the durability of the combustor structure, cooling air is introduced through a plurality of cooling holes in the combustor liner. In addition, dilution air is introduced through several rows of holes in the liners to further mix the reacting gases. Additionally, the inner surface of the liners, the surface adjacent to the hot combustion gases, is coated with a thermal barrier coating systems. Many thermal barrier coating systems exist, and any of these can be used. The thermal barrier coating systems typically include a metallic bond coat and a ceramic top coat to insulate the surface of the liners from the hot gases of combustion.

Combustor liners are formed from a single panel or a plurality of combustor liner panels that are welded together. The liner is attached to the dome assembly by a forward bolt flange. Recently, inner liners after usage in an engine have experienced cracking in two regions of the aft panel assembly, the multi-hole cooling area of the liner. The cracks in the multi-hole cooling area are in line with the fuel cups located in the dome and are typically associated with combustion hot streaks. The cracks in the aft panel flange region are in the area of the aft lip of the liner, located in the portion of the liner adjacent the high pressure nozzle are in line with the high pressure turbine stage 1 nozzles. The cracks may be due to low cycle fatigue caused by large circumferential temperature gradients that reduce the liner low cycle fatigue life in that region. In the past, these cracks have been repaired by welding or other alloy repair process. Weld repair requires further processing to restore dimensional and operational requirements that become economically excessive at some level of cracking. Additionally, the number and location of cracks makes it such that the weld repair is not feasible because hole restoration in the multi-hole cooling area is extensive. At the aft panel flange region, crack repair can result in aft lip distortion and shrinkage. This is unacceptable as the exit throat diameter of the liner is a critical dimension. In the past, the other alternative was to discard the cracked liner and replace it with a new liner. Typically, the liner is made from GTD-222, which has a nominal composition, in weight percent, of about 22.5 chromium, about 14.0 cobalt, about 2.3 titanium, about 1.2 aluminum, about 2.0 tungsten, about 0.8 columbium, and about 1.0 tantalum, with the balance being nickel and incidental impurities, but the liner is not so limited, and other oxidation resistant high temperature alloys may also be used. GTD-222 is an expensive alloy, as are other high temperature, oxidation resistant alloys that may be used in this application, and the processing involved in its manufacture adds to the value of the liner. Thus, it is desirable to develop a method for repairing these liners, so as to salvage as much of the expensive liner as possible and limiting replacement material as much as possible.

A method for repairing the liners is set forth in U.S. Pat. No. 6,568,079 to Farmer et al. and assigned to the assignee of the present application, issued May 27, 2003. This patent sets forth an acceptable method for replacing damaged panels in a combustor. However, the repair method does not address repair of a portion of the aft panel assembly, which is discarded and replaced. The aft panel assembly includes the aft panel, the aft lip, the seal flange area and aft panel support leg. The support leg extends radially inward in the engine across the annular region between the inner liner and the structure and is bolted to the inner structure. Although portions of the aft panel assembly experience crack damage, the aft panel support leg typically is not affected. What is needed is a method for repairing the aft panel of an inner liner by replacing only the damaged portion of the aft panel assembly, without necessitating the scrapping of the aft panel support leg.

SUMMARY OF THE INVENTION

The present invention provides a method of replacing the damaged multi-hole of the aft panel assembly of a combustor liner of a gas turbine engine combustor, while reusing the forward bolt flange and aft panel support leg of the combustor. The combustor includes at least two panels, which are connected by a nugget to form the liner assembly. There is at least one nugget, which is the terminology used to refer to the separation of a pair of panels. The inner and outer liner are joined by the dome assembly to define an annular region, a portion of which defines the combustion zone for the combustor, and which forms a flow path for hot gases of combustion from the combustion zone to the high pressure turbine nozzle. The aft panel assembly of the combustor inner liner includes an aft panel support leg radially extending from the aft lip toward the inner case. The aft panel support leg secures the combustor to the inner structure with bolting means. The aft panel support leg, since it is not in the flow path of the hot gases, does not experience thermally-induced cracking as is experienced by the multi-hole panel and aft lip, which are along the flow path of the hot gases, forming a portion of the fluid boundary.

The repair of the present invention entails cutting a 360° strip of material from the aft section of the combustor liner that includes at least substantially all of the distressed region of the multi-hole panel and aft lip. This removal is accomplished aft of the nugget immediately forward of the aft panel. Depending on the engine design, this region may also include a multi-hole panel region. The liner assembly is also cut adjacent to the seal flange area location where the aft panel support leg extends radially toward the case. This accomplishes removal of the aft panel and aft lip area of the inner liner assembly. The aft panel support leg is then cut from the removed aft panel assembly for reuse, the remainder of the removed aft panel assembly being discarded.

A new aft panel having the same geometric configuration as the removed aft panel is then provided. A new aft lip and seal face is joined to the aft end of the aft panel. The aft panel support leg, which was previously removed from the aft panel assembly, is then joined to the new aft lip and seal face to form a replacement aft panel assembly. The new aft panel assembly can then be joined to the forward portion of the inner liner assembly at the nugget immediately axially forward of the aft panel assembly and the aft portion of the aft panel assembly to the rear of the combustor where the cut was made between the combustor leaf seals and the aft portion of the aft panel assembly.

An advantage of the present invention is that the damaged portion of the aft panel assembly can be removed from the inner liner assembly, while undamaged portions of the aft panel assembly and forward panel and forward bolt flange can be reused. This provides a significant cost savings.

Another advantage of the present invention is that the method permits replacement of the aft panel, the aft lip and the aft seal with the same material as that removed, or any one of, or all of, the aft panel, the aft lip and the aft seal can be replaced with a different material that has the capability of being joined to the nugget material and the aft panel support leg material. The replacement material can be a less expensive material and/or a more durable than the removed material, but with adequate properties, or the replacement material can have superior materials properties than the removed material.

Another advantage of the present invention is that the method permits replacement of aft panel assembly material worn at the inner liner leaf seal interface.

Still another advantage of the present invention is that it permits recovery of portions of the inner liner assembly, which previously were not cost effective to repair and which were discarded.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
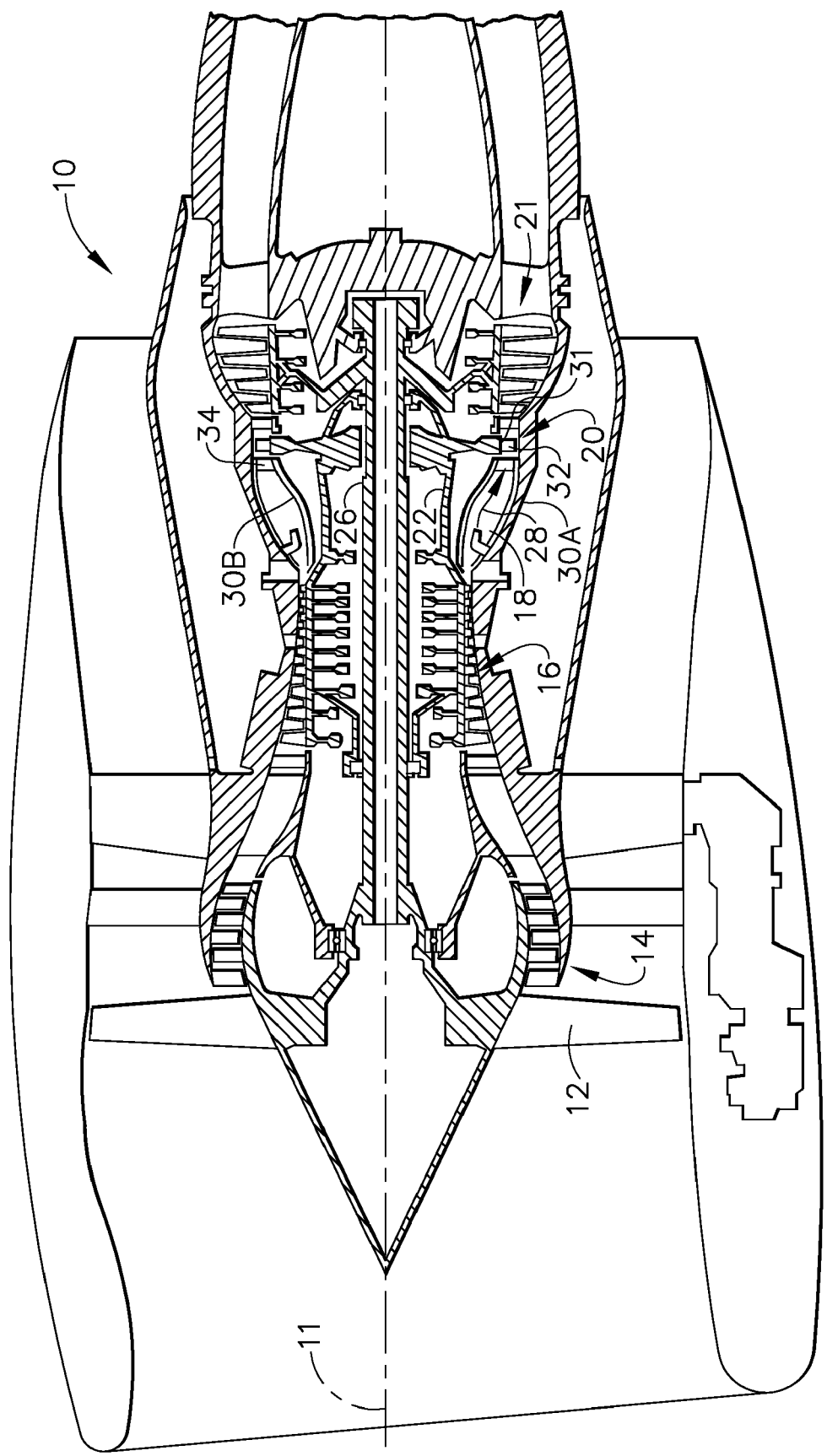
FIG. 1 is a schematic of a typical high bypass gas turbine engine.

FIG. 1 is a schematic of a typical high bypass turbine engine 10. The centerline of the engine is shown at 11, along which the engine shaft 26 is positioned. Air enters the engine 10, passing front fan 12. Some of the air enters the engine core 14 and is directed to the compressor section 16 where it is compressed, while the remainder bypasses the engine core. The compressed air enters the combustion chamber, shown at 30A and 30B where it is mixed with fuel metered from the swirl cup of the fuel injector 18 and ignited. The hot gases of combustion proceed toward the rear of the combustion chamber past the turbine vanes or nozzles 34 and into the turbine rotor 20 where turbine blades 32 in the path of the high pressure gases of combustion are mounted on turbine wheels or disks 31. The high pressure gases pushing on the turbine blades 32 turn the wheels 31 which rotate the engine shaft 26. After the hot gases pass through the turbine section 20, they exit the turbine section at 21 and enter the exhaust as a lower temperature and pressure. The front of the engine is referred to as the forward end and the exhaust of the engine is referred to as the aft end.

Figure 2:
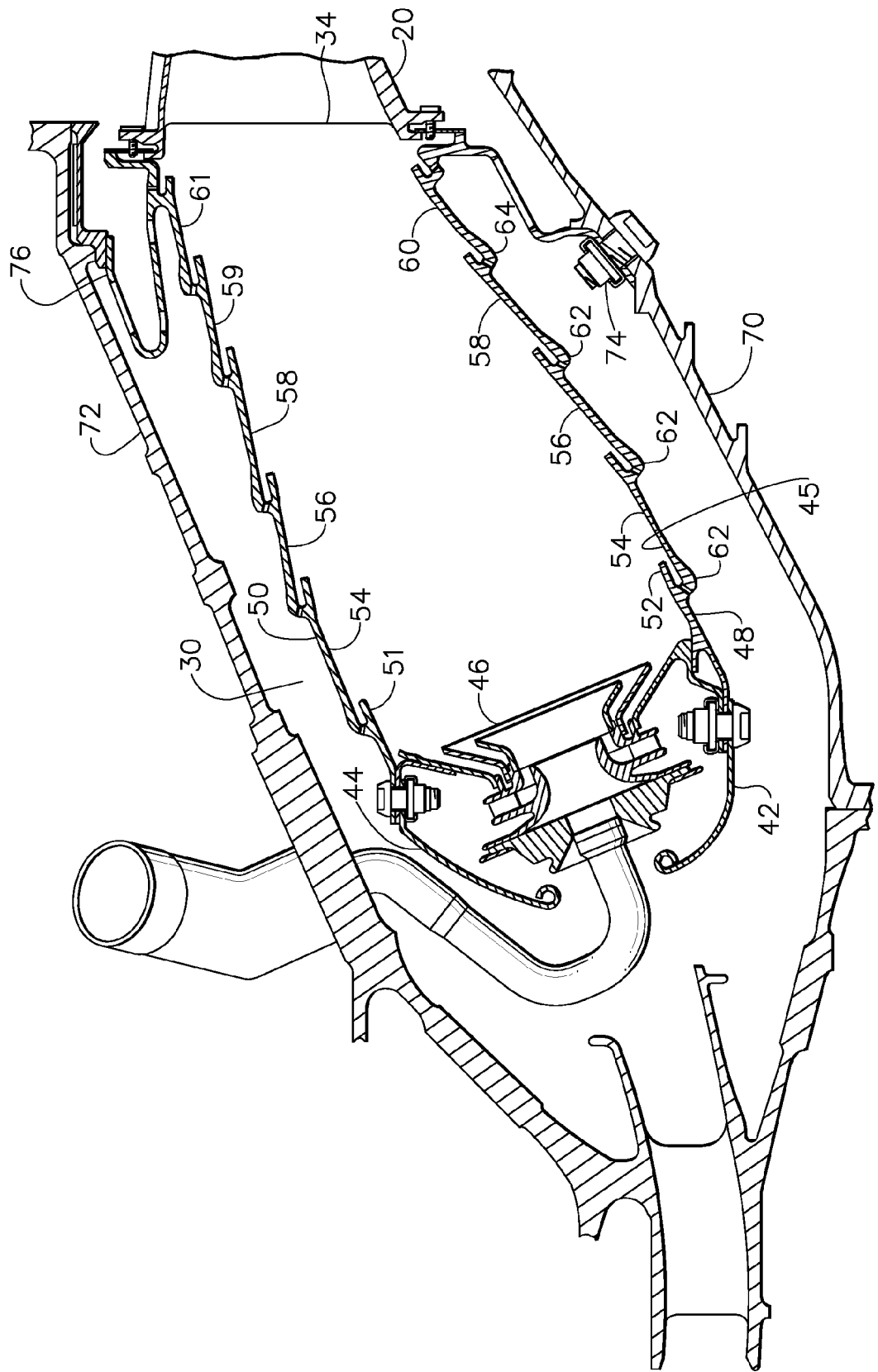
FIG. 2 is a cross sectional view of a typical combustion chamber having liners with multiple film cooling nuggets.

FIG. 2 is a cross sectional view of a typical combustion chamber 30 (either A or B) such as may be found on a CFM-56 engine. This annular combustion chamber 30 is typical of combustion chambers found in all gas turbine engines, and is not restricted to the high bypass turbine engine 10, which is discussed above for illustration purposes. The combustion chamber 30 includes inner cowl 42 and outer cowl 44 bolted to dome assembly 46. The inner liner assembly 48 is comprised of a plurality of panels, panels 52, 54, 56, 58 and an aft panel assembly 60. The panels 52, 54 56, 58 are shown joined together at joints referred to as nuggets 62. The aft panel assembly 60 is similarly joined to the panels forward of it at a nugget 64. The aft panel assembly 60 contacts the high pressure turbine section 20 at the combustor seal support 36. The panels 51, 54, 56, 58, 59 and 61 are similarly joined together to form the outer liner 50. The outer liner 50 and inner liner 44 are joined together to form combustor 45. Combustor 45 is attached to inner casing 70 and outer casing 72, at locations 74 and 76, the inner liner 48 of combustor 45 being bolted to the inner casing 70 at location 74 and the outer liner 50 attached to the outer casing 72, as shown, by any convenient means to form combustion chamber 30.

Figure 3:
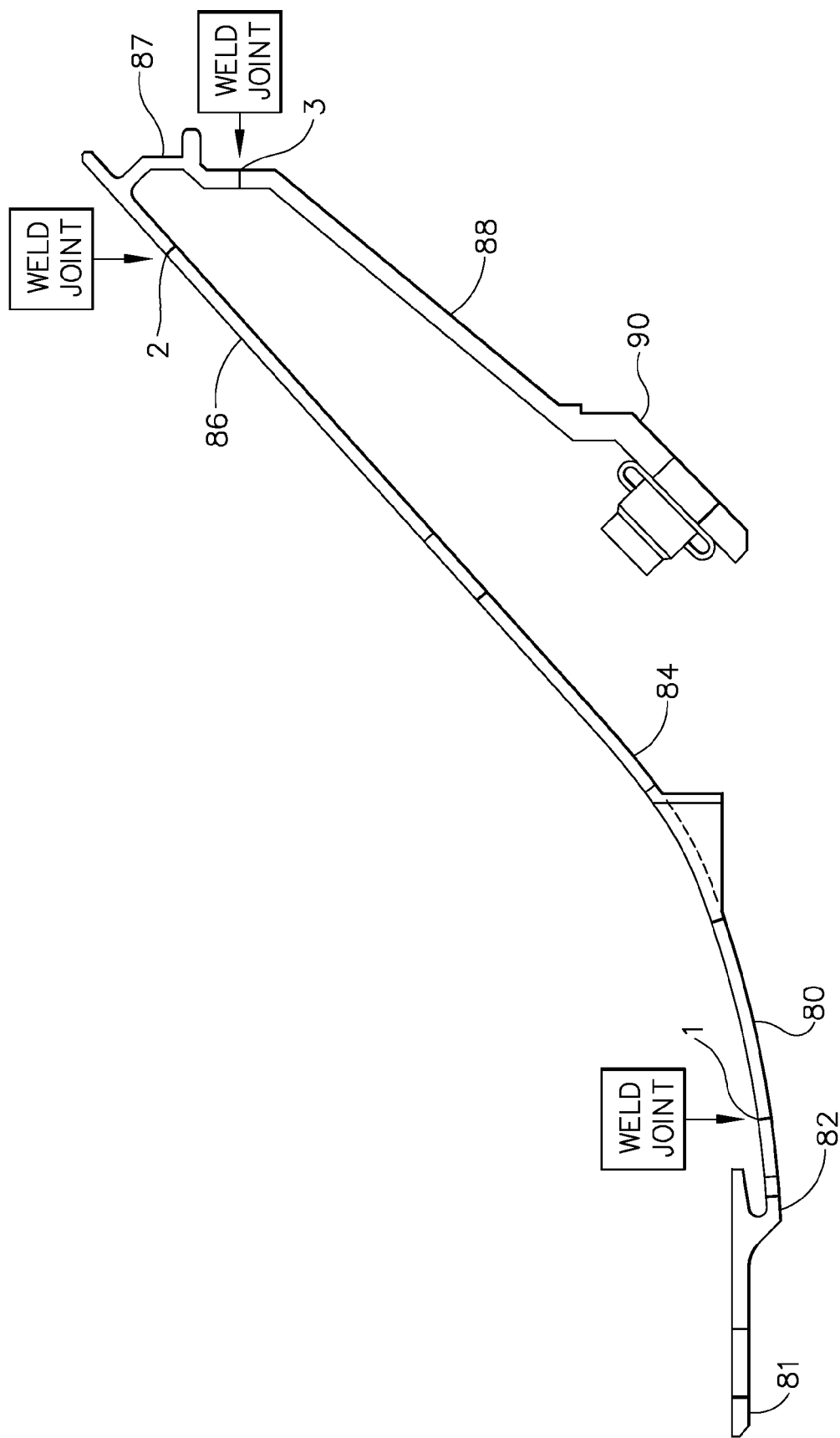
FIG. 3 is a cross-sectional view of the inner liner assembly of the present invention having a single film cooling nugget and a multi-hole cooled panel.

FIG. 3 is a sectional view of an inner liner assembly 80 of a combustion chamber from GE90 engine, which is representative of the present invention. The inner liner assembly 80 from the GE90 differs from the inner liner assembly of the CFM 56 in that inner liner assembly 80 is not comprised of a plurality of panels and an aft panel assembly. Rather, inner liner assembly 80 from the GE90 has a similar configuration to the aft panel assembly 60 of the CFM 56 engine, the GE90 inner liner assembly not having the plurality of panels such as are found in the inner liner assembly of other designs. Notwithstanding this difference, the repair techniques discussed herein are applicable to the inner liner assembly 80 of the GE90 and to the aft panel assembly 60 of the CFM 56 engine, as well as to aft panel assemblies of other designs have the same type of configuration. The inner liner assembly 80 comprises a forward bolt flange 81, a nugget 82, a portion having a plurality of apertures, typically which are drilled, referred to as the multi-hole panel region 84, a portion attached to and aft of the multi-hole panel region, referred to as the aft lip region 86, the aft seal flange region 87 extending downward from the aft lip region 86 and the aft panel support leg 88 attached to the aft seal flange region 87, the aft panel support leg 88 further including an end distal from the attachment to the aft seal flange region, this distal end 90 including a means for attachment with the inner casing. As shown in FIG. 3, the means for attachment is an aperture/bolt arrangement, the threaded aperture in the distal end receiving a bolt extending through inner casing 70. The multi-hole panel region 84 extends across the inner liner assembly substantially perpendicular to the flow of the hot combustion gases. Aft support leg 88 extends downward from aft seal flange region 87 as shown.

As previously noted, cracks have been observed in the inner liner assembly 80 of the GE90 and in the similarly configured aft panel assemblies of other engine designs. These cracks have been most frequently observed in the multi-hole panel region 84 and the aft seal flange region 87, and occasionally in the aft lip region 86. It will be understood by those skilled in the art that, although the current discussion identifies specific areas of the GE90 inner liner assembly, corresponding areas exist in aft panel assemblies of other engine designs, such as aft panel assembly 60 of the CFM-56, discussed above, to which this discussion is also applicable. The prior art practice entailed removal of the aft panel assembly and replacement of the entire assembly, discarding the removed portions. This was accomplished using the techniques of U.S. Pat. No. 6,568,079 to Farmer et al. issued May 27, 2003 and assigned to the assignee of the present invention and U.S. Pat. No. 6,581,285 issued to Emilianowicz issued Jun. 24, 2003, also assigned to the assignee of the present invention. The present invention utilizes some of the techniques of the those patents for salvaging panels to salvage portions of the inner liner assembly for reuse, specifically the aft panel support leg 88 and the forward flange 81, as will be discussed, so the teachings of these patents are incorporated by reference herein.

The inner liner assembly 80 is a complex part typically made of an expensive material, such as for example, GTD-222. In the past, no techniques have been available to effectively repair the inner liner assembly 80, so repair was accomplished by removal and replacement of the entire inner liner assembly. The present invention contemplates repair of the inner liner assembly 80, after removal from the combustion chamber, by replacing the multi-hole panel region 84, aft lip region 86 and aft seal flange region 87. This is accomplished by first removing the multi-hole panel region 84 by cutting it from the combustor at joint 1, FIG. 3. Joint 1 can be cut at any convenient location forward of the holes in the multi-hole region forward to forward bolt flange 81, and may be formed at nugget 82. However, typically joint 1 is formed along the thin, uniform thickness of metal aft of nugget 82, as machining preparations for reattachment are more easily formed in this relatively thin, uniformly thick metal. This removal is performed as set forth in the prior art by using any convenient cutting means. However, instead of discarding the portion of the inner liner assembly aft to joint 1, which includes multi-hole panel region 84, aft lip region 86, aft seal flange region 87 and aft panel support leg 88, the aft panel support leg 88 is cut from the aft panel assembly circumferentially 360° at joint 3. The portion of the inner liner assembly 80 between joint 1 and joint 3 can be discarded. This includes not only multi-hole panel region 84, but also aft lip region 86 and aft seal flange region 87.

The aft support leg 88 can be reused while the aft seal flange region 87, the aft lip region 86 and the multi-hole panel region 84 must be replaced. These items are provided as replacement parts. The aft lip region 86 and aft seal flange region 87 are formed and provided as a single part. The aft lip region 86 and aft seal flange region 87 may be initially machined or formed as a single part. However, these items are currently formed or machined individually and then joined together, such as by welding or brazing to form a single part. How this part is fabricated is not an important feature of the present invention. However, the aft seal flange region is provided with a weld prep at joint 3, which will become weld joint 3. Similarly, aft support leg 88 is provided with a mating weld prep at joint 3 to permit the aft support leg 88 and aft seal flange region 87 to be joined, forming a weld joint 3 when joined. Similarly, the replacement multi-hole panel region 84 is provided with a weld prep at its forward end allowing it to be joined to the inner panel assembly at joint 1. Of course, inner panel assembly also has a weld prep formed at joint 1 after the above-described cut is accomplished. When the multi-hole panel region 84 is welded to the inner panel assembly, a weld joint is formed at joint 1. The multi-hole panel region 84 also has a weld prep formed at its aft end corresponding to a weld prep formed or machined in the forward end of aft lip region 86, allowing the multi-hole panel region to be joined to the aft lip region 88 at joint 2, which becomes weld joint 2 after the weld is formed. The order of joining these elements together to form the repaired inner liner assembly 80 is not important. For example, and as is preferred, the multi-hole panel region 84 is be joined to the forward portion of the inner liner assembly to form weld joint 1. The aft panel support leg 88 is joined to the aft panel lip 86/aft seal flange region 87 to form weld joint 3. Then, forming weld joint 2 completes the inner liner assembly 80. But other sequences for joining these elements may be used to form the inner liner assembly 80. The important consideration is that the profile, the overall length and the diameter of the repaired inner liner assembly fall within key dimensional features, or else fit-up of the repaired inner liner assembly 80 to the combustor 45 and installation of the repaired combustor to form the combustion chamber 30 (A or B) cannot be accomplished.

New make combustor liners typically are manufactured from one material. As an example, combustor liners for the GE90 are manufactured from GTD-222. Combustors typically are manufactured from high temperature nickel base superalloys. During the refurbishment process, the aft panel support leg 88 and the forward bolt flange 81 are reused. So for an inner liner assembly 80 such as used in the GE90, the replacement multi-hole panel region 84, the aft lip region 86 and the aft seal flange region 87 may also be manufactured from the same material. However, the material used for these replacement parts is not so restricted. The replacement multi-hole panel region 84 and the aft lip region 86/aft seal flange region 87 may be manufactured from any material that can be compatibly joined to the material of the forward bolt flange 81 (or portion of the inner liner assembly forward of joint 1) and aft panel support leg 88 respectively, and which has suitable materials properties to survive the harsh environment and temperatures of the combustion chamber 30. Thus, for the GE90, the replacement multi-hole panel region 84 and the replacement aft lip assembly 86 may be manufactured from GTD-222 or any compatible material, such as example HS-188, which is a cobalt-based superalloy having a nominal composition, in weight percent, of about 22% chromium, about 22% nickel, about 15.5% tungsten, about 3.5% iron, about 2% manganese, about 0.4% silicon, about 0.1% carbon, about 0.9% lanthanum and the balance cobalt and incidental impurities. The specifications for HS-188 plate are set forth in AMS-5608. There are several advantages of substituting a different material for the original material, depending upon the operating conditions. The replacement material may be more readily available than the original material. The replacement material may have better high temperature properties than the original material. The replacement material may be cheaper than the original material, or the replacement material may be more workable than the original material. The final inner liner assembly 80 in this embodiment is comprised of dissimilar metals.

Refurbishment is initiated by removal of the forward bolt flange 81 and the aft panel support leg 88 from the inner liner assembly 80. With reference to FIG. 3, first the removed forward bolt flange 81 and aft panel support leg 88 are cleaned and inspected.

Figure 4:
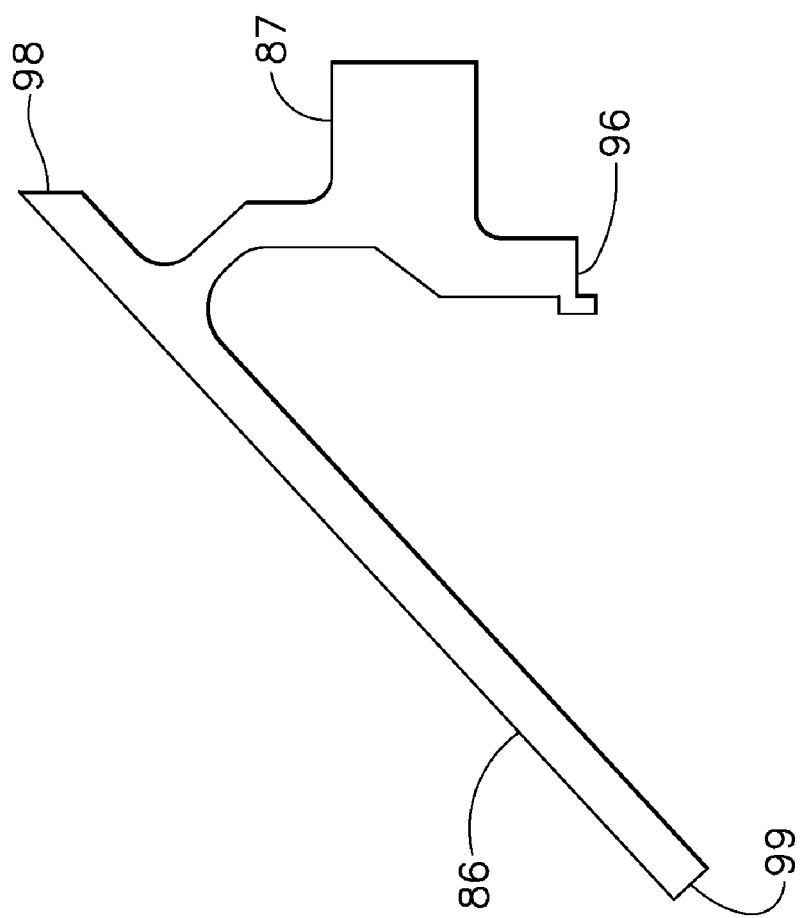
FIG. 4 is a cross-sectional view of the aft panel flange region, including the aft panel, aft lip and seal flange area of the present invention, including the aft panel, aft panel lip and seal flange area.

As the recommended method of repair is by welding, weld preps are provided to the aft panel support leg 88 as well as to the aft lip region 86 of the spare part. As the aft lip region 86 is welded at its forward end to the multi-hole panel region 84 to produce the fabricated replacement spare part, it is necessary to provide a weld prep at its forward end. While welding may be performed by any acceptable method, electron beam welding is one acceptable method and acceptable weld preps for electron beam welding of plate assemblies for a GE90 aft panel assembly are shown in FIG. 4.

A replacement multi-hole panel region 84 and aft lip region 86/aft seal flange region 87 are supplied. The aft end of the multi-hole panel region 84 is provided with a weld joint such as depicted in FIG. 4, and electron beam welding is the preferred welding operation, although other joining processes such as for example, TIG welding, laser welding, or other acceptable welding process as well as brazing may be used. The forward end of the multi-hole panel region is welded at joint 1 and provided with a weld prep so that it can be welded in a manner set forth in the prior art patents, U.S. Pat. No. 6,568,079 and U.S. Pat. No. 6,581,285. This welding of the forward end of the multi-hole panel region 84 to form weld joint 1 typically, but not necessarily, is the last weld accomplished, to complete refurbishment of inner liner assembly 80. FIG. 4 depicts the replacement aft lip region 86/aft seal flange region 87 of the present invention, which is joined to the aft support leg at 96. This is shown in FIG. 3 wherein the aft support leg 88 is joined to the aft lip region 86/aft seal flange region 87 at weld joint 3

The replacement multi-hole panel region 84 may be a formed plate, a casting, a forging, a sheet metal panel or a fabricated (welded) ring. Typically, the multi-hole panel region 84 is in any one of these forms. However, the aft lip region 86 typically is not manufactured of formed plate.

The multi-hole panel region 84 can be prepared with holes or apertures before or after it is welded into position, typically to the aft lip region 86 as the first welding which is accomplished. The apertures are typically formed by EDM machining or by laser drilling, although conventional machining methods may also be utilized. If there is a concern with distortion of finished apertures due to the welding operations, the apertures may be formed by any convenient method after welding.

Although the preferred method for joining the components forming the refurbished aft panel assembly is by forming welds 1, 2 and 3, FIG. 3, by electron beam welding, other methods of welding such as laser welding, tungsten inert gas welding (TIG) and other gas metal arc welding (GMAW) techniques can also be utilized. Nor is the method of joining restricted to welding. For example, joining by brazing which accomplishes a satisfactory joint is also an acceptable technique. Any joining technique may be used that controls distortion so that the critical dimensions of the inner liner assembly 80 can be maintained for fit-up with combustion chamber 30.

The surface of the inner liner assembly 80 exposed to the hot gases of combustion must be provided with a thermal barrier coating system. Although the thermal barrier coating system may be applied to each of the individual elements 84, 86 comprising the inner liner assembly 80 exposed to these hot gases at any time, it is preferred that the thermal barrier coating system be applied to the inner liner assembly 80 after welding operations have been completed. In this manner, the thermal barrier coating system can be applied in a single operation rather than in a plurality of operations one for each of the individual elements, and the welds will simultaneously be covered with the thermal barrier coating system to provide the required protection for surfaces exposed to the hot combustion gases.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for refurbishing a combustion chamber of a gas turbine engine, comprising the steps of:
   removing a combustor from the combustion chamber of the engine;
   removing the inner liner assembly aft of a forward bolt flange, the inner liner assembly farther comprising a multi-hole panel region at its proximal end adjacent to the forward bolt flange and a distal end farther comprising an aft lip region aft of the multi-hole panel region, an aft seal flange region extending from the aft lip region and an aft panel support leg extending from the aft seal flange region;
   separating the multi-hole panel region from the inner liner assembly aft of the forward bolt flange;

separating the aft panel support leg from the aft seal flange region;

discarding the separated multi-hole panel region, the aft lip region and aft seal flange region;

providing a replacement multi-hole panel region and an aft lip region/aft seal flange region;

inspecting and refurbishing the aft panel support leg and the forward bolt flange;

joining the replacement multi-hole panel region to the replacement aft lip region/aft seal flange region at an aft lip region joint prep;

joining the refUrbished aft panel support leg to the aft seal flange region;

joining the replacement multi-hole panel region to the inner liner assembly aft of the refurbished forward bolt flange to reform the inner liner assembly; and coating exposed metal surfaces of the reformed inner liner assembly with a thermal barrier coating system.

2. The method of claim 1 wherein the step of coating exposed metal surfaces includes coating the replacement multi-hole panel region and the replacement aft lip region.

3. The method of claim 1 wherein the step of providing a multi-hole panel region and an aft lip region includes providing a multi-hole panel region and an aft lip region coated with a thermal barrier coating system.

4. The method of claim 1 further including the step of refurbishing the inner liner assembly aft of the forward bolt flange by providing a weld prep to the inner liner assembly aft of the forward bolt flange where the inner liner assembly is separated from the multi-hole panel region.

5. The method of claim 1 wherein the step of inspecting and refurbishing the aft panel support leg and the forward bolt flange region further includes inspecting and refurbishing the thermal barrier coating system applied to at least the forward bolt flange region.

6. The method of claim 1 wherein the step of inspecting and refurbishing the aft panel support leg and the forward bolt flange region further includes providing a weld prep to the aft lip region where the aft panel support leg is separated from the aft seal flange region.

7. The method of claim 1 wherein the step of joining the replacement multi-hole region to the inner liner assembly aft of the forward bolt flange includes forming a first joint.

8. The method of claim 1 wherein the step of providing a replacement multi-hole panel region and a replacement aft lip region/aft seal flange region includes providing the aft lip region and aft seal flange region as a single formed part.

9. The method of claim 8 wherein forming includes forging.

10. The method of claim 8 wherein forming includes machining.

11. The method of claim 1 wherein the step of providing a replacement multi-hole panel region and a replacement aft lip region/aft seal flange region includes providing the aft lip region and aft seal flange region as separate parts subsequently joined together by welding.

12. The method of claim 1 wherein the step of providing a replacement multi-hole panel region and a replacement aft lip region/aft seal flange region includes providing the aft lip region and aft seal flange region as separate parts subsequently joined together by brazing.

13. The method of claim 1 wherein the step of joining the replacement multi-hole panel to the inner liner assembly aft of the refurbished forward bolt flange includes forming a first joint.

14. The method of claim 1 wherein the step of joining the replacement multi-hole region to the aft lip region includes forming a second joint.

15. The method of claim 1 wherein the step of joining the refurbished aft panel support leg to the aft seal flange region includes forming a third joint.

16. The method of claim 1 wherein the at least one of the steps of joining is accomplished by welding.

17. The method of claim 16 wherein the welding is accomplished by at least one welding process selected from the group consisting of electron beam welding, laser welding, tungsten inert gas welding and gas metal arc welding.

18. The method of claim 1 wherein at least one of the steps of joining is accomplished by brazing.

19. The method of claim 1 further including the steps of attaching the reformed inner liner assembly to the combustor; and assembling the combustor in the engine.

* * * * *